United States Patent [19]
Alfors et al.

[11] Patent Number: 5,644,225
[45] Date of Patent: Jul. 1, 1997

[54] METHOD FOR CALIBRATING AN ANGULAR POSITION SENSOR

[75] Inventors: Eugene D. Alfors, Rockford; Joseph K. Murdock, Freeport, both of Ill.

[73] Assignee: Honeywell Inc., Minneapolis, Minn.

[21] Appl. No.: 632,874

[22] Filed: Apr. 16, 1996

[51] Int. Cl.$^6$ .......................... G01R 35/00; G01B 7/30
[52] U.S. Cl. ........................... 324/202; 324/207.2
[58] Field of Search ........................ 324/173, 174, 324/202, 205, 207.11–207.14, 207.2, 207.21, 207.25

[56] References Cited

U.S. PATENT DOCUMENTS

| | | | |
|---|---|---|---|
| 4,782,293 | 11/1988 | Steingroever et al. | 324/205 |
| 5,164,668 | 11/1992 | Alfors | 324/207.12 |
| 5,332,965 | 7/1994 | Wolf et al. | 324/207.2 |
| 5,500,589 | 3/1996 | Sumcad | 324/202 |

*Primary Examiner*—Gerard R. Strecker
*Attorney, Agent, or Firm*—William D. Lanyi

[57] ABSTRACT

A method is provided to calibrate an angular position sensor by using an electrical coil to provide a magnetic field that simulates the presence of a permanent magnet. By successively selecting currents to flow through the electrical coil and by moving the electrical coil through at least two angular positions, the gain of an output relationship between a signal from a magnetically sensitive component and the angular position of the coil can be determined. By changing the intensity of the electrical current flowing through the coil, the intensity of the magnetic field emanating from the coil can be selected. In order to achieve the appropriate null offset characteristic of the device, the electrical coil is moved until a preselected output voltage is achieved. By comparing the angular position of the coil when the output voltage is achieved to an angular position of the coil for the desired output signal characteristic, a calibration angle can be determined. A ferromagnetic object is then magnetized with a magnetic field of the determined intensity and at an angle equal to the calibration angle.

7 Claims, 10 Drawing Sheets

METHOD FOR CALIBRATING AN ANGULAR POSITION SENSOR

BACKGROUND OF THE INVENTION

1. Field of the Invention

The present invention is generally related to angular position sensors and, more specifically, to a method for calibrating the magnetization of a permanent magnet which is needed to achieve certain specified output characteristics in response to the angular movement of the permanent magnet and the shaft to which it is attached.

2. Description of the Prior Art

Many different types of angular position sensors are known to those skilled in the art. Alfors U.S. Pat. No. 5,164,668, which issued on Nov. 17, 1992, discloses an angular position sensor which exhibits decreased sensitivity to shaft position variability. The angular position sensor is provided with first and second pole pieces that extend from regions proximate a rotatable magnet to regions proximate a magnetically sensitive device. The pole pieces provide defined magnetic paths of lowered reluctance that confine the lines of flux extending between the rotatable magnet and the magnetically sensitive device. The placement of the rotatable magnet between first and second pole piece segments of the invention significantly reduces the sensitivity of the sensor to variations in position of the rotatable magnet and therefore increases the reliability of the measurement system. This reduced sensitivity inhibits the degradation of operational accuracy that could otherwise be caused by inaccuracies in the magnet's shaft position, large tolerances in the dimensions of the shaft diameter and the bearing diameter and variable location of the shaft because of excessive wear. U.S. Pat. No. 5,164,668 is explicitly incorporated by reference in this application.

Wolf et al U.S. Pat. No. 5,332,965, which issued on Jul. 26, 1994, describes a linear angular position sensor which has an adjustable flux concentrator for sensitivity adjustment and temperature compensation. The position sensor includes a magnetically sensitive device, such as a Hall effect element, and a plurality of flux concentrators rigidly disposed relative to the Hall effect element. The assembly is disposed in a housing a fixed distance from a rotatably mounted standard magnet defining a fixed airgap therebetween. The magnet is disposed in a rotatably mounted magnet holder which also acts as a drive arm that is adapted to be mechanically coupled to a pivotally mounted device. The configuration of the flux concentrators assembled to the magnetically sensitive device causes the output of the Hall effect element to be generally linear. In order to avoid problems associated with electrically adjustable angular position sensors, the angular position sensor is adjusted mechanically. In particular, a flux concentrator, preferably having a halo shape, is disposed adjacent the magnet. The sensor is calibrated by varying the distance between the halo-shaped flux concentrator and the magnet. In one embodiment of the invention, the halo-shaped flux concentrator is formed to provide temperature compensation for the sensor. The sensor is hermetically sealed and is thus unaffected by wear or vibration.

U.S. patent application Ser. No. 08/405,651, now U.S. Pat. No. 5,512,820, which was filed on Mar. 17, 1995 by Alfors discloses a rotational position sensor with a two-part rotatable member to resist jamming. The rotational position sensor is provided with a rotatable member that comprises first and second portions. The first portion is generally cylindrical and has an opening that is shaped to receive the second portion therein with a resilient spring disposed in the annular gap between the first and second portions when this assembly is accomplished. A permanent magnet is molded into or otherwise affixed to an extension of the first portion and the second portion of the rotatable member is shaped to receive a shaft. Relative rotation is permitted between the first and second portions of the rotatable member so that the shaft will not be seized in position if the rotatable member is jammed within a stationary portion of the sensor. If jamming occurs, such as that which might be caused by icing, the first portion of the rotatable sensor might be seized in position and restricted from further rotational movement. However, the second portion will remain free to rotate with the shaft because of the relative angular movement that is permitted between the first and second portions. This movement is in association with the changing torsion of the spring disposed in the gap between the first and second portions. When the seizing of the first portion of the rotatable member is eliminated, the first and second portions of the rotatable member move back to their regular positions relative to each other and continued normal operation is possible.

Both of the devices described immediately above utilize a rotatable permanent magnet that is attachable to a shaft. Rotation of the permanent magnet about a centerline of the shaft allows the sensor to determine the angular position of the shaft with respect to a preselected reference position. A magnetically sensitive component is disposed in magnetic association with the permanent magnet, typically through the use of ferromagnetic pole pieces, and an output of the magnetically sensitive component is used to represent the angular position of the permanent magnet and its attached shaft.

Several problems exist with regard to the calibration and testing of angular position sensors of the type described immediately above. Since permanent magnets can vary from one to another in their magnitude and precise direction of magnetization, the output signal from the magnetically sensitive component may exhibit a characteristic in relation to the angular position of the permanent magnet that is not the precisely desired characteristic. In addition, because the variability of manufacture can result in one angular position sensor being slightly different in its magnetic characteristics than another, the intensity of the magnetic field imposed on the magnetically sensitive component may differ from sensor to sensor for the same angular position of the permanent magnet. Because of this, several techniques have been developed that allow angular position sensors to be calibrated to account for these variabilities. One calibration technique involves the use of thin film resistors that can be trimmed with a laser to adjust the output signal from the magnetically sensitive component. Other techniques may involve the mechanical movement of ferromagnetic objects to advantageously affect the magnetic field. During calibration, these ferromagnetic objects are typically moved until the output signal from the magnetically sensitive component matches a desired output signal for each of several preselected angular positions of the permanent magnet. Both of these calibration techniques involve the use of components (e.g. circuits, magnets, pole pieces, magnetically sensitive elements) that combine to result in an initial output signal from the magnetically sensitive component which is later adjusted or corrected to make the output signal characteristic exhibit a preselected and desired characteristic in relation to the angular position of the permanent magnet and its attached shaft. In other words, through the use of either electrical or mechanical alteration, the assembled angular position is altered to provide a correct output characteristic of the magnetically sensitive component's output signal as a result of the angular position of the shaft. It would therefore be advantageous if a calibration procedure could be developed which allows the magnet to be magnetized in such a way that it compensates for all other variabilities of the sensor to achieve a desired characteristic of the output signal from the magnetically sensitive component as a function of the angular position of the permanent magnet.

SUMMARY OF THE INVENTION

The method of the present invention relates to calibrating an angular position sensor that is intended to have a rotatable permanent magnet disposed within it. In addition, the angular position sensor has a magnetically sensitive component, such as a Hall effect element or a magnetoresistive element, which has an output signal that is representative of the angular position of the rotatable permanent magnet relative to a reference position. The method of the present invention comprises a first step of providing an electrical coil which is rotatable about a first axis. The coil is capable of producing a magnetic field when an electrical current is passed through it. With the permanent magnet absent from the housing of the angular position sensor, the method of the present invention then disposes the electrical coil at a location in relation to the magnetically sensitive component to simulate the rotatable permanent magnet. The next step of the calibration method comprises selecting a desired relationship between the output signal from the magnetically sensitive component and the angular position of the permanent magnet. This desired relationship has a desired gain which is measured as the magnitude of change of the output signal from the magnetically sensitive component for each incremental change in the angular position of the permanent magnet. In other words, this gain would typically be measured in units of volts per degree of angular rotation. The present invention also includes a step of providing an initial magnitude of electrical current through the electrical coil for the purpose of creating an initial magnitude of magnetic field emanating from the electrical coil. Then, the electrical coil is moved through at least two angular positions about its first axis. This movement of the electrical coil is intended to provide at least two magnitudes of output signal that will permit the gain of the relationship between the output signal and the angular position to be determined.

The next step of the present invention comprises determining an initial relationship between the output signal and the angular position of the electrical coil for the initial magnitude of magnetic field that resulted from providing the initial magnitude of electrical current through the coil. Then, the method of the present invention includes a step of calculating an initial gain of the initial relationship and comparing the calculated initial gain to the desired gain. A second magnitude of electrical current is then provided through the electrical coil to create a second magnitude of magnetic field which can be greater or less than the initial magnitude of current, depending on the required correction. The second magnitude of current is determined as a function of the difference between the initial gain and the desired gain, wherein the second magnitude of electrical current is selected to achieve the desired gain based on the experience of having previously achieved the initial gain as a result of the initial current and the initial magnetic field. By incrementally changing the current and then determining the gain of the relationship after each change in current, the desired gain of the relationship between the output from the magnetically sensitive component and the angular position of the permanent magnet can be achieved.

The present invention then proceeds with the calibration method for the purpose of determining the required angular offset that will be necessary to achieve the desired null characteristic of the output voltage as a function of the angular position of the permanent magnet. This portion of the procedure comprises the step of rotating the electrical coil in order to cause the output signal of the magnetically sensitive component to achieve a preselected calibration magnitude, wherein the preselected calibration magnitude is selected as a function of the desired gain and a preselected angular position of the electrical coil. In other words, based on the known gain and null value of the desired output characteristic, the output signal for any angular position of the permanent magnet can be predicted. After selecting a reference angular value and determining the expected output signal associated with that angular magnitude, the coil is moved about its first axis until that calibration magnitude of the output value is achieved. When the preselected calibration magnitude of the output signal is achieved, a calibration angle can be measured with respect to the reference position that would have achieved the same magnitude of output signal if the gain and null characteristics of the device were precisely equal to the desired characteristics. The difference between the angle of the coil when the calibration magnitude is achieved and the desired angle of the coil that would result in the same output signal for the magnetically sensitive component is the calibration angle that is measured by the procedure of the present invention.

After the intensity of the magnetic field necessary to achieve the desired gain is known and the calibration angle between the alignment of the magnetic field and a reference position are known, a ferromagnetic object can then be magnetized to suit these parameters. The next step of the present invention therefore comprises magnetizing a ferromagnetic object to create the permanent magnet with the second magnitude of magnetic field at an angle that is equal to the calibration angle relative to a second reference position of the ferromagnetic object. In most applications of the present invention, the second reference position of the ferromagnetic object is a centerline that is coincident with its central axis. After it is magnetized, the permanent magnet is then disposed in the angular position sensor with the second reference position aligned relative to the first reference position. In other words, the second reference position to which the magnetic field was aligned when the permanent magnet was magnetized is arranged in the housing of the angular position sensor to match the first reference position that had been used to measure the necessary calibration angle to achieve the appropriate null characteristic of the output signal. A permanent magnet that has been magnetized in this manner according to the steps of the method of the present invention will exhibit the necessary characteristics that result in an output characteristic of the magnetically sensitive component that possesses the gain and null characteristics that are desired.

BRIEF DESCRIPTION OF THE DRAWINGS

The present invention will be more fully and completely understood from a reading of the Description of the Preferred Embodiment in conjunction with the drawings, in which.

DESCRIPTION OF THE PREFERRED EMBODIMENT

Figure 1:
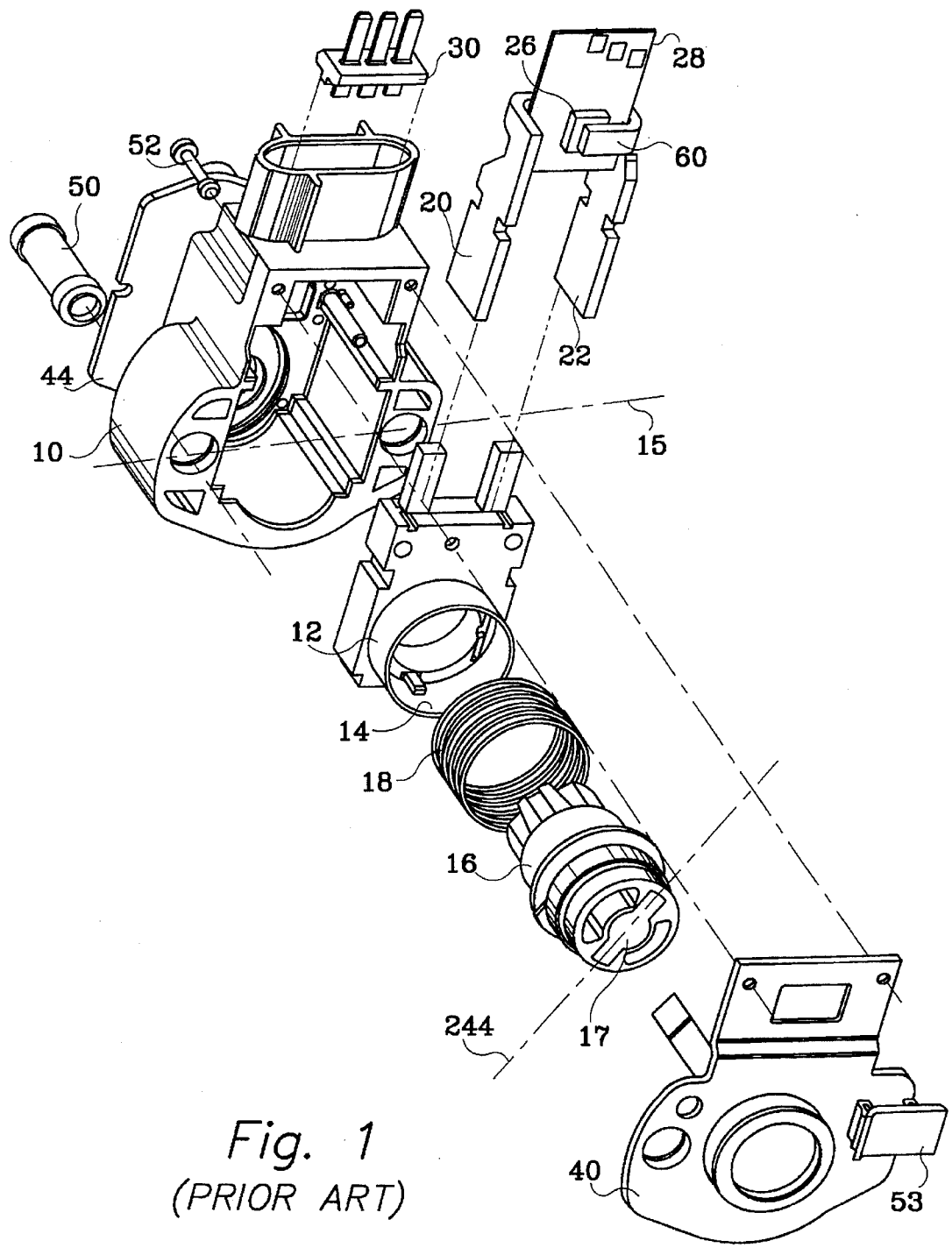
FIG. 1 is a perspective exploded view of a known angular position sensor structure.

Throughout the Description of the Preferred Embodiment, like components will be identified by like reference numerals. FIG. 1 shows a perspective exploded view of a known type of angular position sensor. A housing 10 is provided that has an opening formed within it that is shaped to receive a carrier 12. The carrier 12 has an opening 14 which is shaped to receive a rotatable permanent magnet structure 16 and a spring 18 within the cylindrical opening 14 of the carrier 12. In addition, two ferromagnetic pole pieces, 20 and 22 are received in the carrier along with a magnetically sensitive component 26 that is attached to a printed circuit board 28. As is known by those skilled in the art, the two ferromagnetic pole pieces, 20 and 22, can be formed in an L-shape so that the magnetically sensitive component 26 can be disposed between them. A connector lead carrier 30 is provided so that an external component can be connected in signal communication with the angular position sensor. In addition, a front cover 40 and a back cover 44 are used to enclose the rotatable magnet assembly 16 and the other components within the housing 10. A mounting insert 50, a rivet 52 and a window cover 53 are also shown in FIG. 1. In FIG. 1, reference line 15 is shown with respect to the housing 10. In addition, line 244 is shown with respect to the actuation feature 17 of the rotatable permanent magnet structure 16. The relative positions of lines 15 and 244 are related to the calibration procedure and will be described in greater detail below.

With continued reference to FIG. 1, rotation of the rotatable permanent magnet 16 causes its magnetic field to move with respect to the ferromagnetic pole pieces, 20 and 22. This movement of the magnetic field changes the intensity of the magnetic field passing between the leg 60 of the second ferromagnetic pole piece 22 and another similarly configured leg of the first ferromagnetic pole piece 20 that is behind the printed circuit board 28 and not visible in FIG. 1. The changing intensity of the magnetic field passing through the magnetically sensitive component 26 allows the angular position of the rotatable permanent magnet 16 to be determined as a function of the output voltage signal from the magnetically sensitive component 26. The operation of a device such as that illustrated in FIG. 1 is well known to those skilled in the art and is described in the prior art discussed above.

In an angular position sensor such as that shown in FIG. 1, the output signal from the magnetically sensitive component 26 may not exhibit the precise gain and null output characteristics that are desired in the sensor. To correct this situation, typical angular position sensors use one of two methods. First, resistors on either an integrated circuit or the printed circuit board 28 are altered to advantageously affect the output signal from the magnetically sensitive component 26. This can be done, for example, by trimming resistors during the calibration process. As an alternative known method, the magnetic circuit provided by the first and second ferromagnetic pole pieces, 20 and 22, can be altered by either bending the pole pieces or moving other ferromagnetic objects in the vicinity of the pole pieces or magnet. This alteration of the magnetic field will have a corresponding effect on the output signal from the magnetically sensitive component as a function of the angular position of the rotatable permanent magnet 16. The purpose of the present invention, as will be described in greater detail below, is to provide a calibration method that does not require the later correction or alteration of either the electronics or the physical structure of the angular position sensor. The method of the present invention includes the magnetization of the permanent magnet to a predetermined magnitude and direction of magnetic field to result in a permanent magnet that causes the output signal from the magnetically sensitive component to exhibit the desired gain and null offset with respect to the angular positions of the rotatable permanent magnet 16.

With continued reference to FIG. 1, it should be understood that the rotatable permanent magnet structure 16 typically comprises a permanent magnet that is molded within a plastic structure. The permanent magnet can typically be a parallelepiped or a cylinder that is molded within the generally cylindrical shape of the outer structure identified by reference numeral 16 in FIG. 1. The physical position of the magnet relative to the actuation feature 17 is fixed during the molding process.

Figure 2:
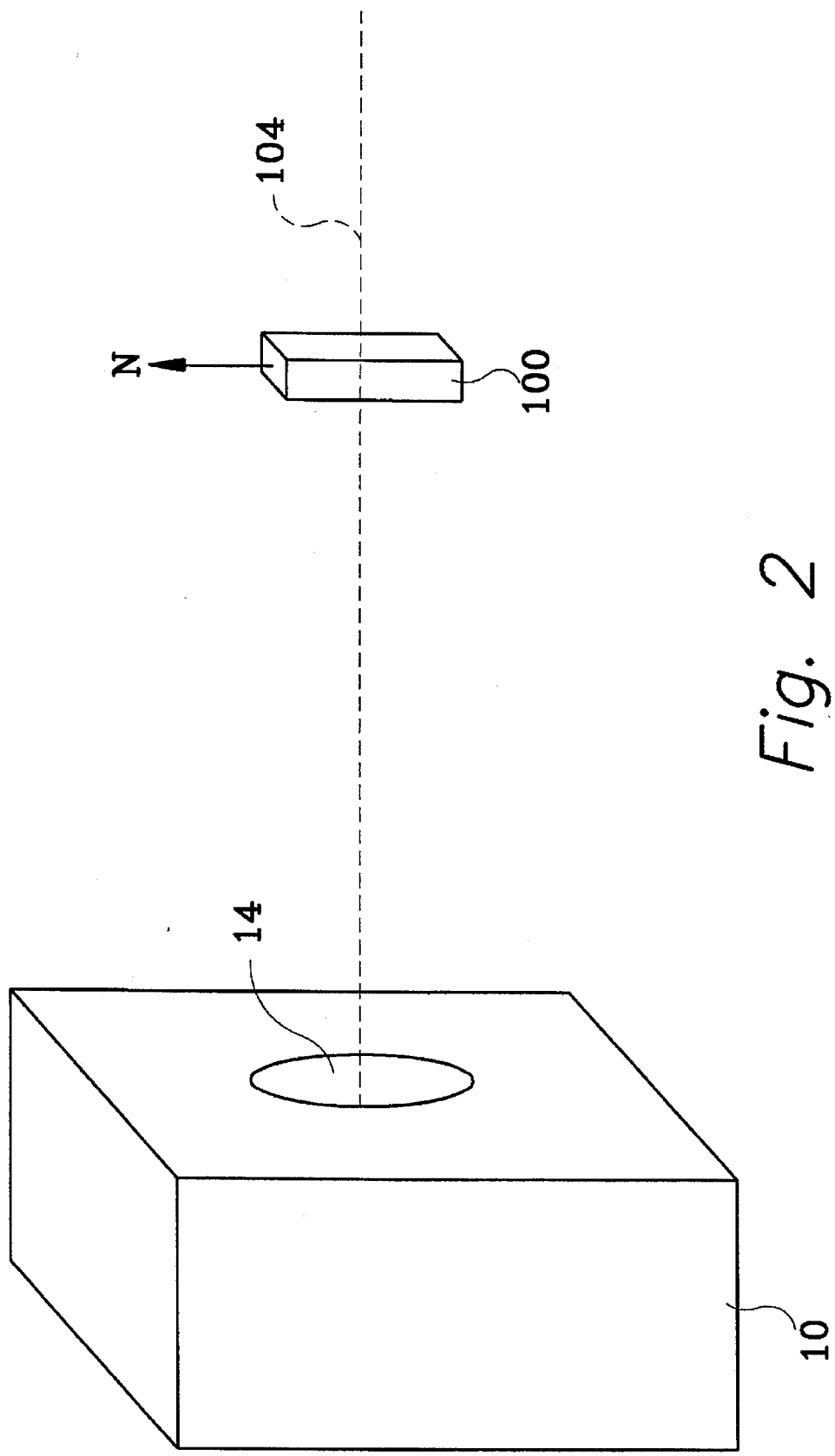
FIG. 2 is a schematic representation of an electrical coil associated with an angular position sensor.

FIG. 2 is a schematic view of the housing 10 of an angular position sensor. Although shown in a highly simplified manner in FIG. 2, the angular position sensor 10 is provided with a cylindrical opening 14. These components in FIG. 2 represent the housing 10 and cylindrical opening 14 shown in FIG. 1 and described above. The method for calibrating an angular position sensor begins with the step of providing an electrical coil 100 which is rotatable about a first axis 104. Although the electrical coil 100 is represented as a simple parallelepiped in FIG. 2, it can be other shapes. For example, it can be a simple cylindrical coil of wire or a coil of wire wrapped around a ferromagnetic core. It can also be encapsulated in plastic for protection and mounting. The electrical coil is shaped to be received in the cylindrical opening 14. When an electrical current is provided through the electrical coil 100, a magnetic field emanates from the coil as represented by the arrow in FIG. 2 that shows the direction of the magnetic north pole of the magnetic field extending from the coil when it is energized with an electrical current. The electrical coil 100 will not be described in further detail herein because of the well known manner in which coils operate to generate a magnetic field and the fact that these types of coils are very well known to those skilled in the art.

With the permanent magnet 16 absent from the cylindrical opening 14, the electrical coil 100 is inserted into the cylindrical opening 14 at a position which is suitable to simulate the presence of a permanent magnet. This location disposes the electrical coil 100 in magnetic communication with a magnetically sensitive component 26 within the angular position sensor 10.

Figure 3:
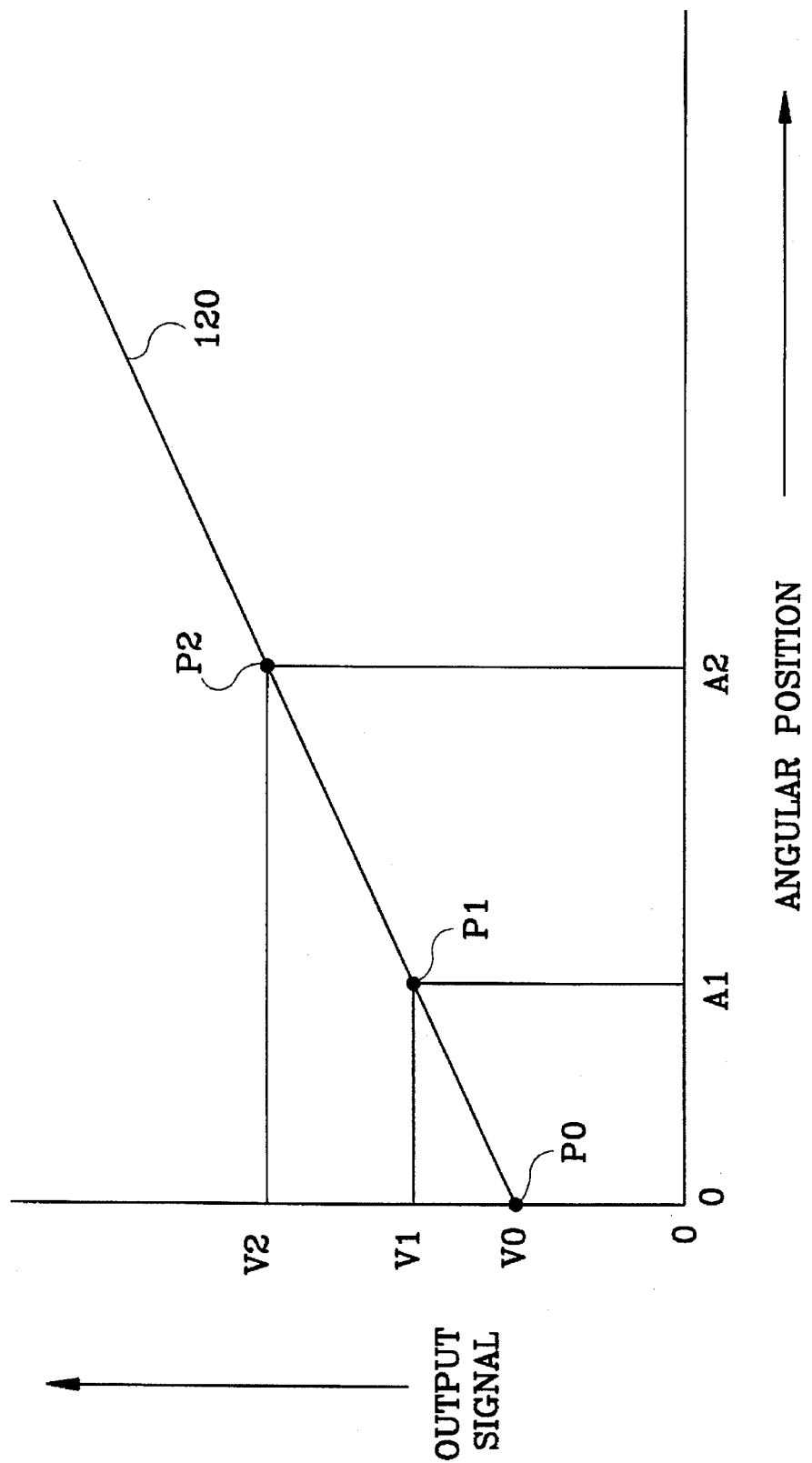
FIG. 3 shows the gain and null output characteristics of a desired relationship between the output signal of a magnetically sensitive component and the angular position of a rotatable permanent magnet.

FIG. 3 represents a hypothetical relationship, represented by line 120, between the output signal from the magnetically sensitive component 26 and the angular position of the permanent magnet structure 16. The desired relationship, as defined herein, is the relationship which will provide appropriate output signals in response to angular movement of the permanent magnet structure in a manner which allows the angular position of the permanent magnet structure to be accurately determined. If the relationship is generally linear, as represented by line 120, the relationship can be defined by the gain and null offset of the output signal. For example, if the output signals, V1 and V2, are known for two angular positions, A1 and A2, of the permanent magnet structure 16, the slope of line 120, or the gain characteristic of the relationship, can easily be calculated. In addition, when the output signal V0 is selected or determined, the null output signal of the magnetically sensitive component is known. By knowing the slope of line 120 and its intercept with the vertical axis, the characteristic or relationship of the hypothetical sensor can be described. Similarly, by specifying the slope, or gain, of the relationship and its null output signal V0 where it intercepts the vertical axis, a desired relationship can be specified. The values of the gain and null offset for the relationship represented in FIG. 3 are shown in equations 1 and 2.

$$GAIN_{DESIRED}=(V2-V1)/(A2-A1) \qquad (1)$$

$$NULL\ OFFSET_{DESIRED}=V0 \qquad (2)$$

After the desired relationship is selected, an initial magnitude of electrical current is provided through the electrical coil 100 in FIG. 2. This initial magnitude of electrical current will create an initial magnitude of magnetic field emanating from the electrical coil 100. With this initial magnitude of electrical current flowing through the electrical coil and with the coil emanating the initial magnitude of magnetic field, the electrical coil is moved through at least two angular positions about its first axis 104. For purposes of illustrating this process, the two angular positions will be selected to be the same two angular positions, A1 and A2, described above in conjunction with FIG. 3.

Figure 4:
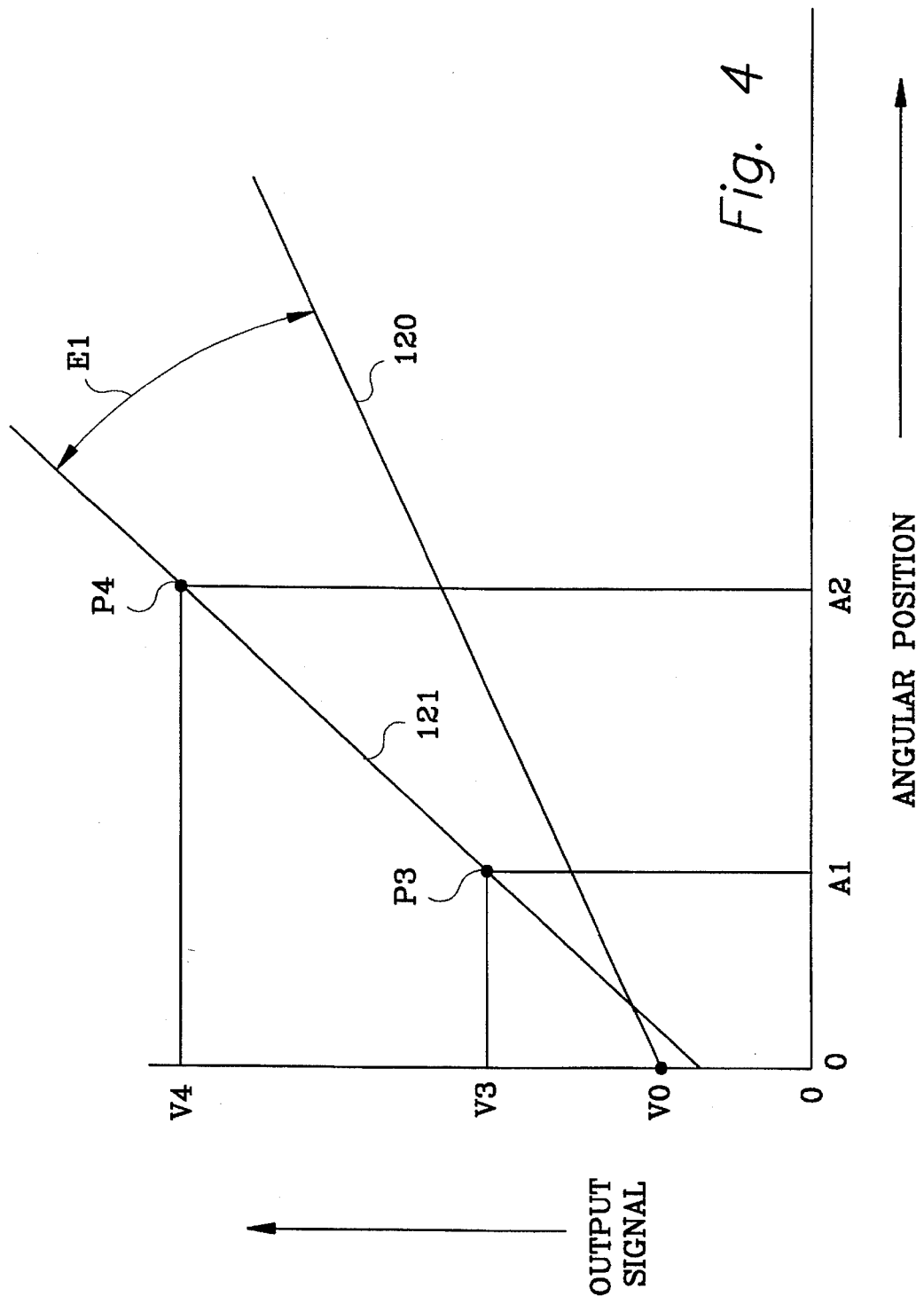
FIG. 4 shows an initial relationship between the output signal and an angular position achieved by an initial magnetic field from the electrical coil.

In FIG. 4, the two angular positions, A1 and A2, are shown. Line 120 represents the desired relationship described above in conjunction with FIG. 3. Line 121 represents the initial relationship that results from the initial magnetic field emanating from the electrical coil as it moves through the two angular positions, A1 and A2. This provides the information relating to points P3 and P4 and allows the initial relationship to be determined. By measuring the output signals, V3 and V4, which correspond to the angular positions, A1 and A2, respectively, the gain of line 121 can be determined. This initial gain resulting from the provision of the initial magnetic field can be determined by equation 3 below.

$$GAIN_{INITIAL}=(V4-V3)/(A2-A1) \qquad (3)$$

As can be seen in FIG. 4, the slopes of lines 120 and 121 are clearly different. This difference in gain can also be determined by calculating the initial gain characteristic of the initial relationship represented by line 121, and, when the initial gain characteristic of equation 3 and line 121 is compared to the desired gain characteristic of equation 1 and line 20, the difference between the desired and initial relationships can be determined. By noting the magnitude of the difference between the desired gain characteristic and the initial gain characteristic, which is schematically represented by arrow E1 in FIG. 4, corrective action can be taken.

The method of the present invention comprises providing a second magnitude of electrical current to the electrical coil to create a second magnitude of magnetic field as a function of the difference between the initial gain characteristic and the desired gain characteristic. The second magnitude of electrical current is selected to achieve or approach the desired gain characteristic. It should be recognized that this step of the present invention can be accomplished in at least two ways. First, the second current magnitude can be determined mathematically in view of empirical evidence relating to the structure and magnetic characteristics of typical angular position sensors. In this way, the second current magnitude can possibly be calculated as a function of the initial current magnitude and the difference in gain characteristics between lines 121 and 120 in FIG. 4. However, a much more likely implementation of the present invention would be to incrementally change the current through the electrical coil and observe the effects of those incremental changes. In other words, if it is determined that the current through the coil was too high and caused the emanated magnetic field to be too high, an incremental decrease in the current could be tried to determine the result of this change. Based on a newly measured pair of output signals from the magnetically sensitive component 26, successive changes would be made in an incremental manner to slowly achieve the desired gain represented by line 120.

Figure 5:
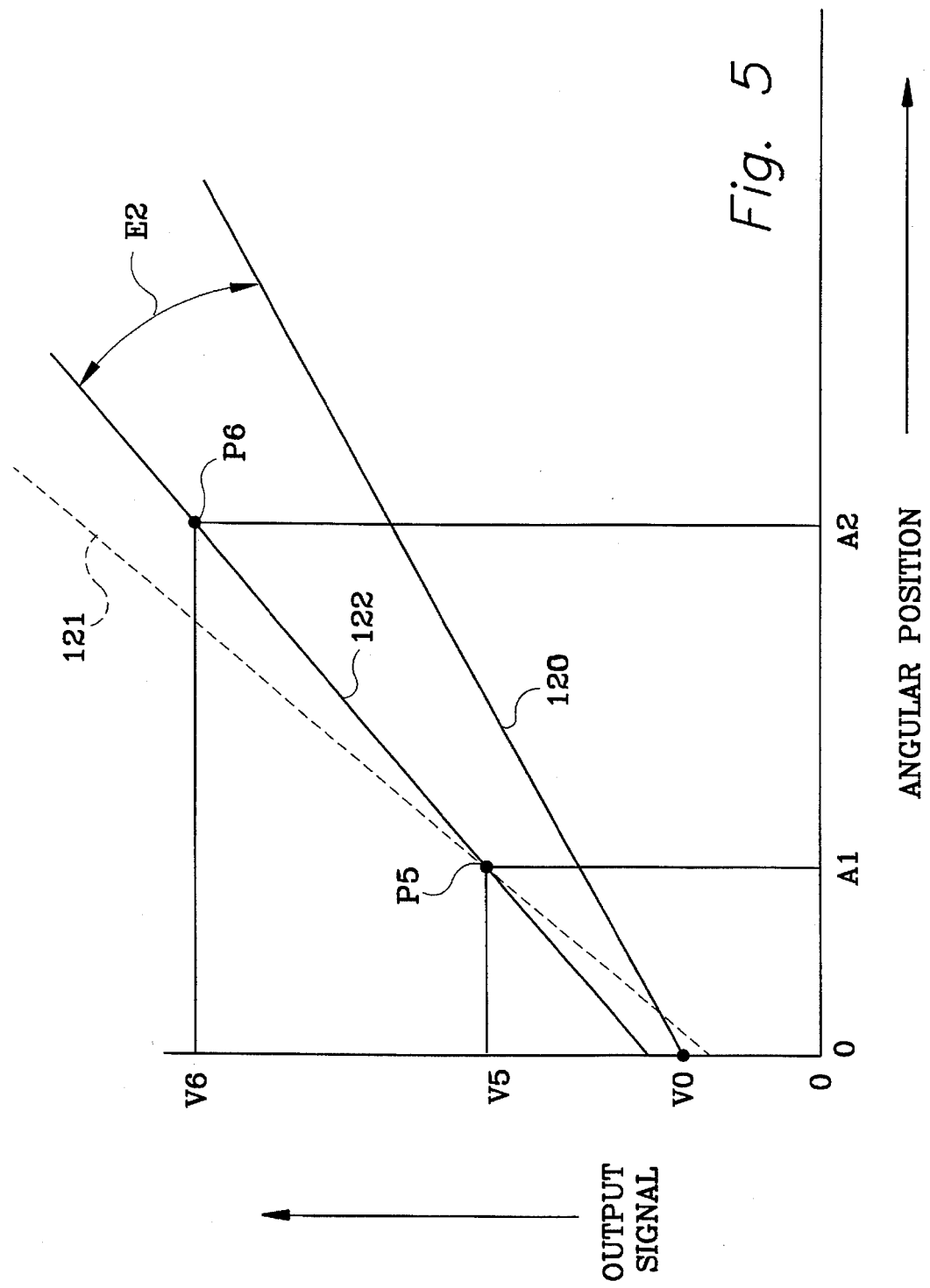
FIG. 5 shows a subsequent relationship between the output signal and angular position of the electrical coil resulting from a subsequent magnitude of magnetic field from the electrical coil.

FIG. 5 shows the desired relationship of line 120, the initial relationship of line 121 and a second relationship of line 122. Line 122 represents the line drawn through points P5 and P6 which result from moving the coil through the two angular positions, A1 and A2, and observing the output voltages from the magnetically sensitive component 26 for those two angular positions. Line 121 is shown as a dashed line to indicate its relative position to line 122 which represents the gain characteristic resulting from providing a second magnitude of electrical current through the electrical coil to create a second magnitude of magnetic field as a function of the difference between the initial gain characteristic of line 121 and the desired gain characteristic of line 120. The second magnitude of electrical current is selected to achieve the desired gain characteristic of line 120. However, in an incremental procedure, it is not always expected to achieve a precise solution equal to line 120 on the second provision of electrical current through the coil. As can be seen in FIG. 5, the gain of line 122 is closer to the gain of line 120 than was the initial line 121. The gain of line 122 is mathematically represented in equation 4. The difference in gain characteristics between lines 120 and 122 is schematically represented by arrow E2 in FIG. 5.

$$GAIN_{SECOND}=(V6-V5)/(A2-A1) \qquad (4)$$

Since a difference error in gain characteristic exists between lines 120 and 122, another current magnitude is then provided through the electrical coil and the electrical coil is again moved through at least two angular positions, A1 and A2. This gain is represented by points P7 and P8 in FIG. 6 and is shown mathematically in equation 5.

$$GAIN_{SECOND}=(V8-V7)/(A2-A1) \qquad (5)$$

Figure 6:
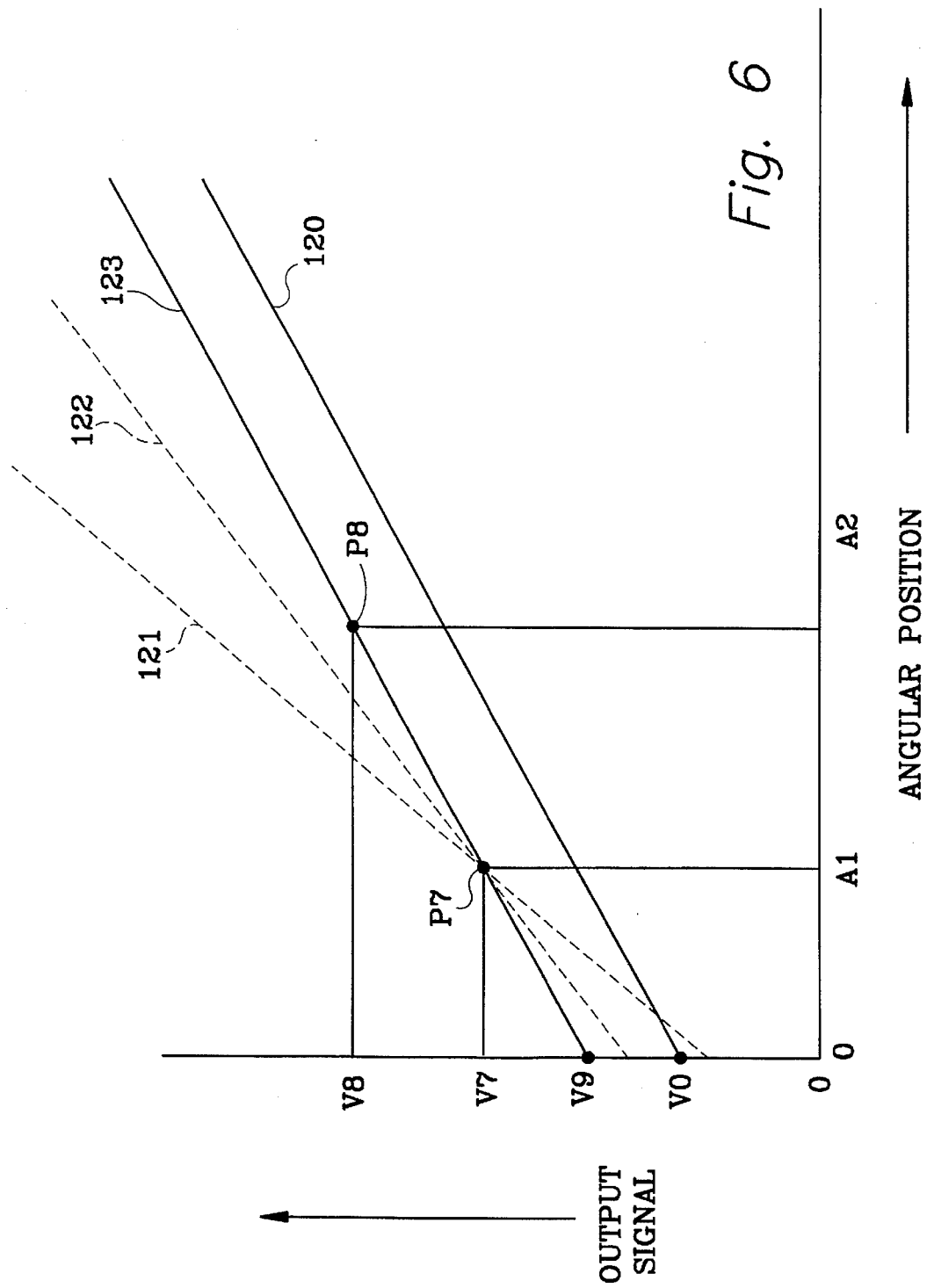
FIG. 6 shows another subsequent relationship resulting from a different magnetic field from the electrical coil.

In FIG. 6, lines 121 and 122 are shown as dashed lines to indicate their previous locations prior to the provision of the electrical current through the electrical coil to achieve the results shown by line 123. As can be seen in FIG. 6, line 123 is generally parallel to line 120. This general parallelism between the gain characteristics of the desired relationship represented by line 120 and the most recently achieved relationship represented by line 123 indicates that the desired gain has been generally achieved. This is also shown by general equality between the desired gain represented in equation 1 and the most recently achieved gain represented by equation 5.

Although the gain characteristic of the angular position sensor has been appropriately selected by incrementally changing the current flowing through the electrical coil 100, the null offset characteristic is not equal to the desired null offset characteristic. In other words, line 123 indicates an intercept with the vertical axis at a voltage V9 whereas line 120 indicates an intercept with the vertical axis at voltage V0. The next step of the method of the present invention is intended to determine the change that is necessary to move the null offset of line 123 to a magnitude equal to V0. This is achieved by determining a calibration angle, between the central axis of the magnetic field emanating from the electrical coil and a reference, that would achieve the appropriate null offset V0 for line 123. In other words, the present invention is intended to determine the necessary calibration angle, or offset angle, to move line 123 to the position of line 120 in FIG. 6.

Figure 7:
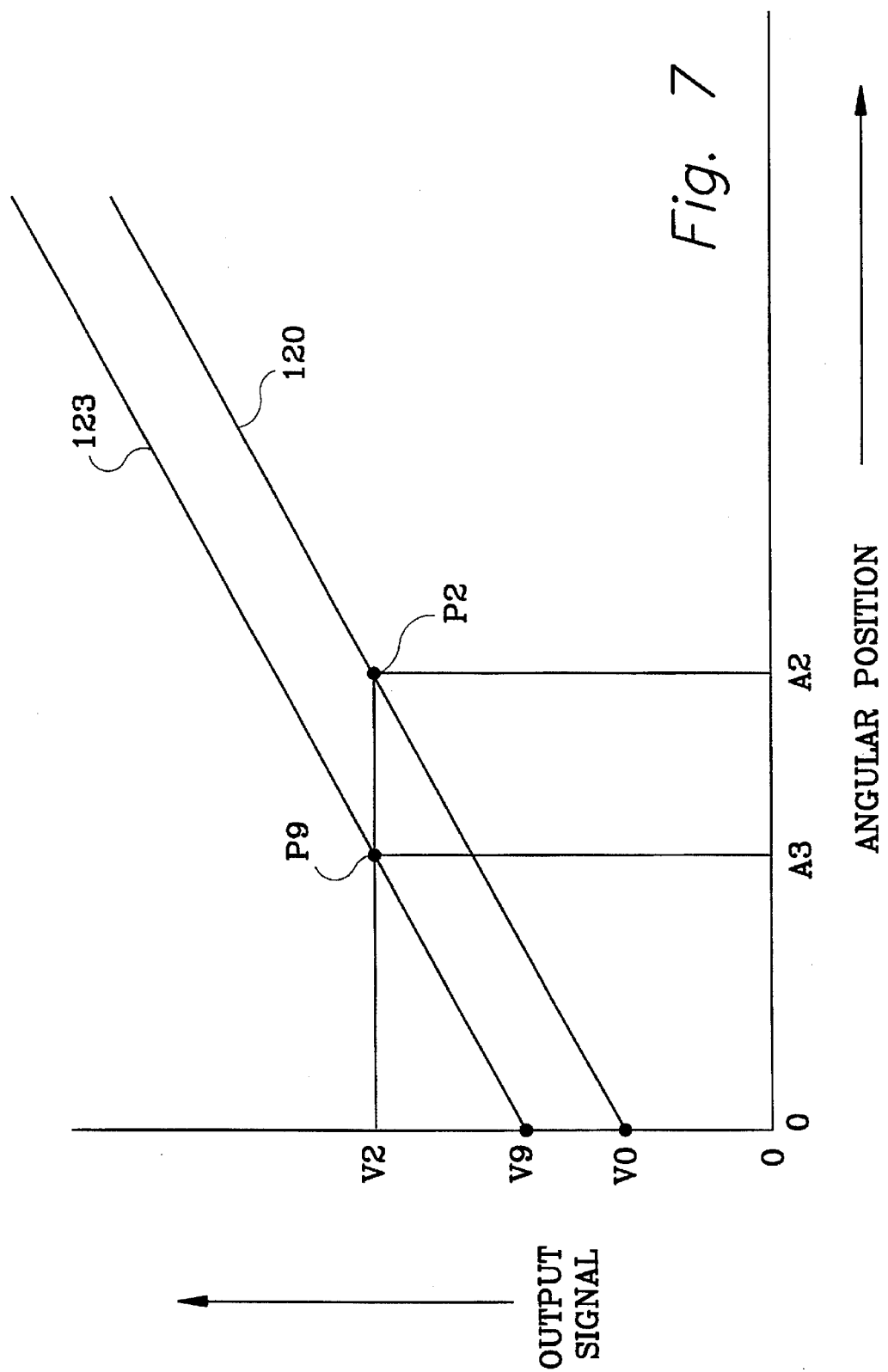
FIG. 7 shows two relationships between output signals and angular positions that have generally equal gains but different null output characteristics.

With reference to FIG. 7, the next step of the present invention is that of rotating the electrical coil to cause the output signal to achieve a preselected calibration magnitude V2 which is selected as a function of the desired gain characteristic and a preselected angular position of the electrical coil. In other words, it is known that the desired characteristic represented by line 120 will result in an output voltage of V2 when the electrical coil is moved to an angular position A2. The above described step in the method of the present invention moves the electrical coil until an output voltage of V2 is achieved. Since lines 120 and 123 are not identical to each other because of the different null output characteristic represented by the difference between output voltages V9 and V0, a different angular position A3 is necessary to achieve an output signal of V2 by the electrical coil. A calibration angle is measured as the difference between angular positions A2 and A3. As described above, angular position A2 is the angular position that a desired characteristic would require to achieve an output signal of V2. Angular position A3 is the actual angular position necessary for the electrical coil to achieve an output voltage of V2 from the magnetically sensitive component 26. The difference between these two angular positions, as shown in Equation 6, is the calibration angle of the electrical coil which is determined by measuring the difference between angular position A2, or the first reference position, to the angular position A3 which achieves the preselected calibration magnitude V2 of the output signal when the electrical coil is disposed in magnetic relation with the magnetically sensitive component 26. These parameters result from the relative positions of points P2 and P9 in FIG. 7.

$$\Theta_{CALIBRATION} = A2 - A3 \qquad (6)$$

Figure 8:
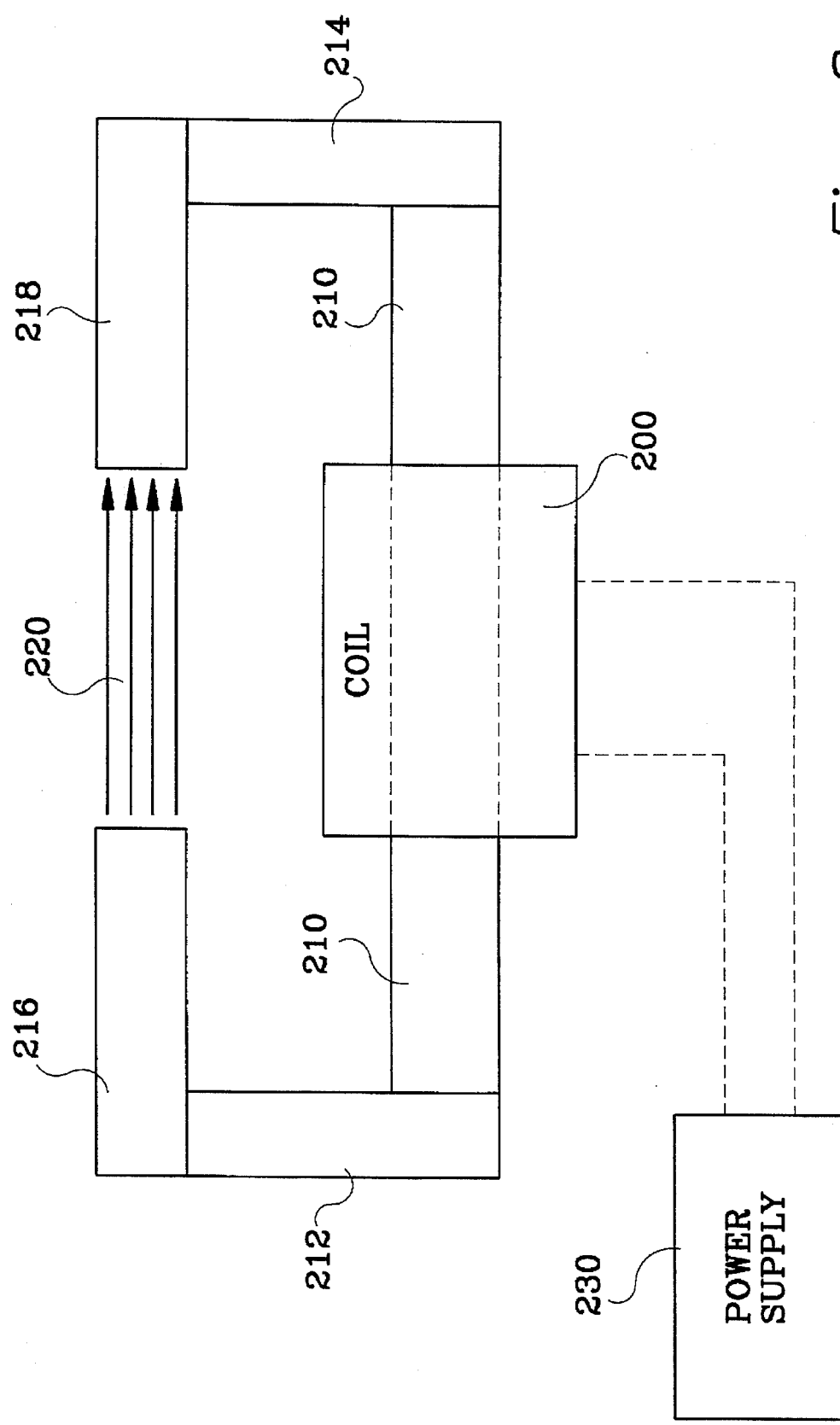
FIG. 8 is a schematic representation of a device that can be used to magnetize a permanent magnet.

FIG. 8 is a schematic representation of a magnetizing device that can be used to magnetize components made of a ferromagnetic material. A coil 200 is used to induce a magnetic field which extends through the ferromagnetic components identified by reference numerals 210, 212, 214, 216 and 218. The magnetic field also extends across the gap between ferromagnetic components 216 and 218 as represented by arrows 220. The coil 200 is energized by a power supply 230. When the coil 200 is energized, a ferromagnetic object placed in the gap between components 216 and 218 will be magnetized to a degree determined by the strength of the magnetic field induced by coil 200.

Figure 9:
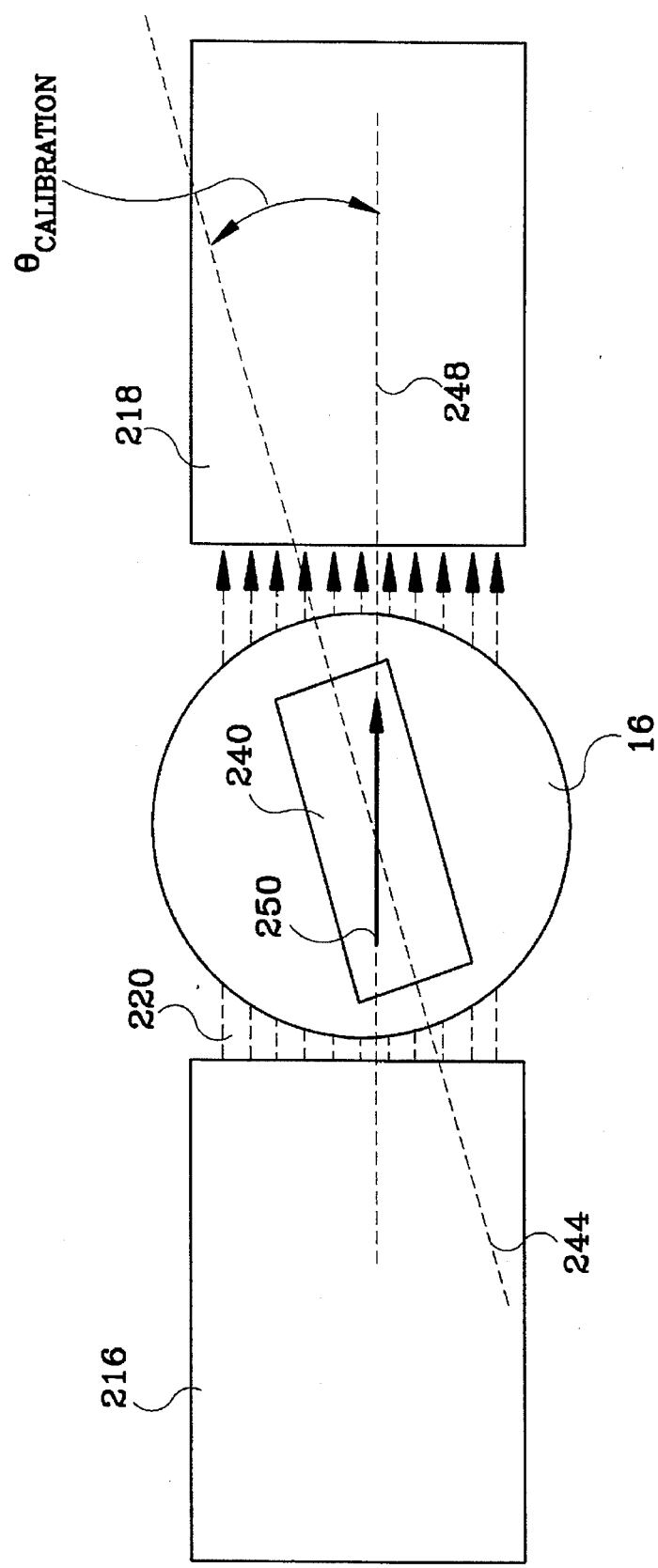
FIG. 9 is a sectional view of a portion of the device shown in FIG. 8.

FIG. 9 is a partial view of the system shown in FIG. 8. In FIG. 9, components 216 and 218 of the system of FIG. 8 are shown isolated from the remaining components. FIG. 9 also shows the permanent magnet structure 16 that was described above in conjunction with FIG. 1. In a typical construction of the permanent magnet structure 16, a bar magnet 240 is encapsulated within the plastic structure 16. Dashed line 244 represents a centerline of the bar magnet 240. It should be understood that the bar magnet 240 is typically manufactured by starting with a piece of isotropic ferromagnetic material and then magnetizing it to achieve its characteristics as a permanent magnet. Dashed line 248 represents a line that is parallel to the lines of flux 220 which extend through the gap between ferromagnetic components 216 and 218. By disposing the centerline 244 of the permanent magnet 240 at an angle $\Theta_{CALIBRATION}$, the permanent magnet 240 can be magnetized to achieve the offset angle that was calculated in the manner described above in conjunction with FIG. 7 and equation 6.

The procedure described above achieves a direction of magnetization that is represented by arrow 250 in FIG. 9. The magnitude of magnetization of the permanent magnet 240 is determined by the magnitude of magnetization necessary to achieve the gain described above in conjunction with equation 5. The angle of calibration, represented by the angle between lines 248 and 244, is determined in the manner described above in conjunction with FIG. 7 and equation 6. When the permanent magnet 240 is magnetized at the angle shown in FIG. 9 and with the intensity of magnetic field that had been determined to be sufficient to achieve the appropriate desired gain, the permanent magnet structure 16 can be disposed in the angular position sensor with its second reference position, represented by line 244, aligned relative to the first reference position, represented as angular position A2 in the description above. This should result in an output characteristic from the magnetically sensitive component 26 which has the gain characteristic and null offset characteristic of the desired relationship represented by line 120 in FIGS. 3-7.

Figure 10:
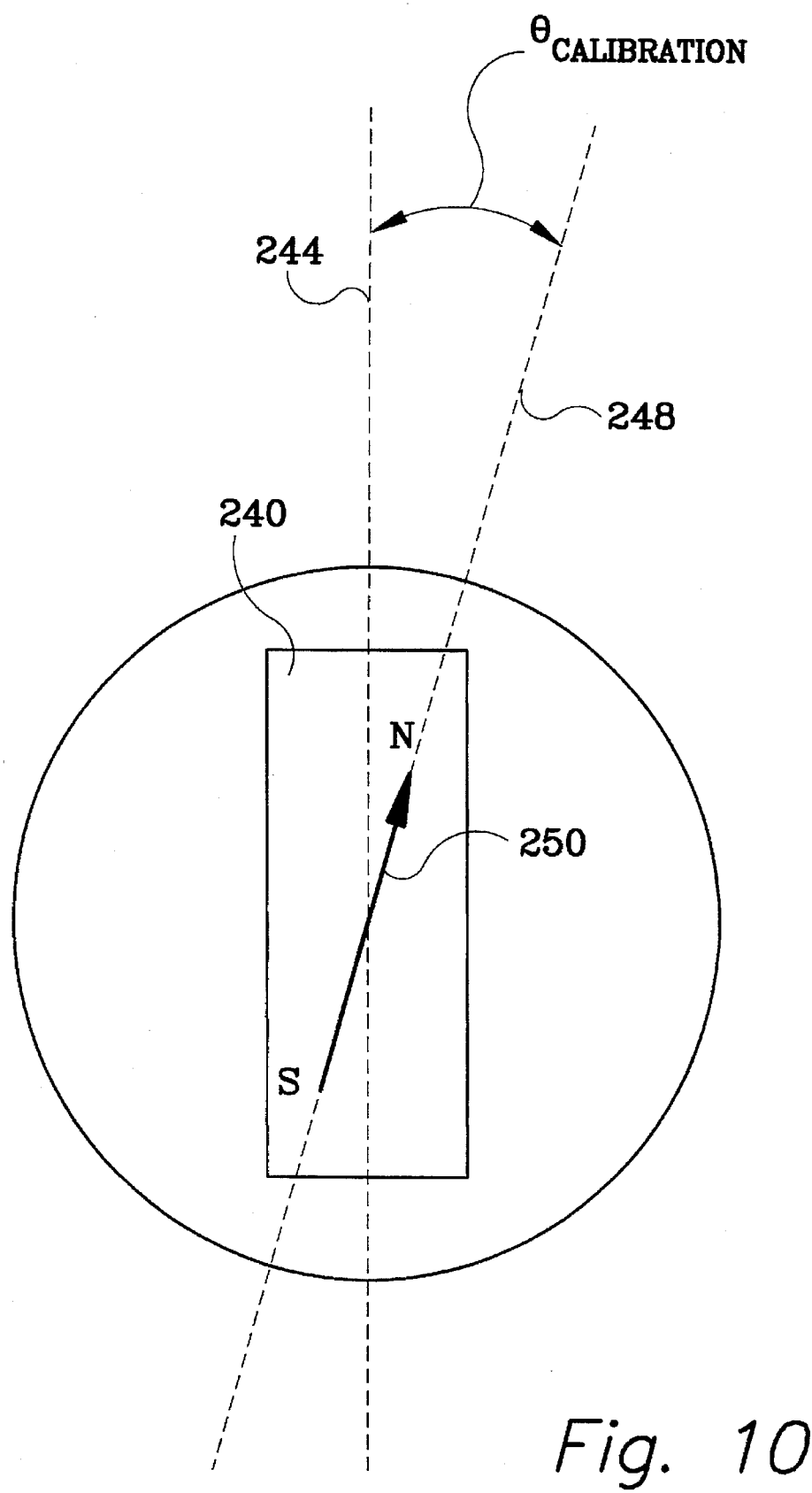
FIG. 10 shows a permanent magnet structure magnetized according to the method of the present invention.

FIG. 10 shows the permanent magnet structure 16 with the centerline of the magnet 248 disposed at an angle from line 244 which represents the direction of magnetization 250. It should be understood that the magnetization process described above in conjunction with FIGS. 8 and 9 can be performed in several different ways. One known method for magnetizing a ferromagnetic object consists of an initial step of overmagnetizing the ferromagnetic object to have a magnetic field of an intensity that is greater than the desired magnetic field. Then, with successive iterative steps, an opposite magnetic field is used to "knock down" the magnetic field of the magnetized permanent magnet until the desired intensity is achieved. Depending on the equipment used to perform the magnetization process and depending on the types of materials of the magnet and the power capabilities of the equipment, several alternative techniques can be employed to achieve this process. The present invention is not limited to any specific magnetization technique.

When the method of the present invention is employed, each permanent magnet 240 is magnetized to suit the particular angular position sensor in which it will be employed. In other words, each permanent magnet structure 16 is custom made to suit the individual characteristics of the components of the angular position sensor. This individualized calibration procedure takes into account all of the variabilities that could affect the output characteristics of the signal from the magnetically sensitive component 26. These variabilities can be caused by the ferromagnetic pole piece structure associated with the magnetically sensitive component, the magnetically sensitive component itself, the variability of the components on the printed circuit board 28 associated with the output circuit of the sensor or the relative placement of the pole pieces, the magnetically sensitive component and the rotatable permanent magnet within the permanent magnet structure 16. The calibration process of the present invention determines the appropriate intensity of magnetic field provided by the permanent magnet which is necessary to achieve the gain of the output characteristic. In addition, the angle of the magnetic field relative to a reference location is determined to achieve the null offset characteristic of the relationship.

Although the present invention has been described with considerable specificity and illustrated to show one preferred embodiment of the present invention, it should be understood that alternative embodiments are also within its scope.

The embodiments of the invention in which an exclusive property or right is claimed are defined as follows:

1. A method for calibrating an angular position sensor which is intended to have a rotatable permanent magnet and a magnetically sensitive component having an output signal which is representative of the angular position of said rotatable permanent magnet, said method comprising:

(a) providing an electrical coil, said electrical coil being rotatable about a first axis;

(b) with said permanent magnet absent from said angular position sensor, disposing said electrical coil at a location in relation to said magnetically sensitive component to simulate the presence of said rotatable permanent magnet;

(c) selecting a desired relationship between said output signal and the angular position of said permanent magnet, said desired relationship having a desired gain characteristic;

(d) providing an initial magnitude of electrical current through said electrical coil to create an initial magnitude of magnetic field emanating from said electrical coil;

(e) moving said electrical coil through at least two angular positions about said first axis;

(f) determining an initial relationship between said output signal and the angular position of said electrical coil for said initial magnitude of magnetic field;

(g) calculating an initial gain characteristic of said initial relationship;

(h) comparing said initial gain characteristic to said desired gain characteristic;

(i) providing a second magnitude of said electrical current to create a second magnitude of said magnetic field as a function of the difference between said initial gain characteristic and said desired gain characteristic, said second magnitude of electrical current being selected to achieve said desired gain characteristic;

(j) rotating said electrical coil to cause said output signal to achieve a preselected calibration magnitude, said preselected calibration magnitude being selected as a function of said desired gain characteristic and a preselected angular position of said electrical coil;

(k) measuring a calibration angle of said electrical coil, relative to a first reference position of said angular position sensor, which achieves said preselected calibration magnitude of said output signal;

(l) magnetizing a ferromagnetic object to create said permanent magnet with said second magnitude of magnetic field at an angle equal to said calibration angle relative to a second reference position of said ferromagnetic object; and (m) disposing said permanent magnet in said angular position sensor with said second reference position aligned relative to said first reference position.

2. The method of claim 1, wherein:

step (i) comprises a plurality of steps in which said second magnitude of magnetic field is incrementally changed to incrementally reduce the difference between said desired gain characteristic and said initial gain characteristic.

3. The method of claim 1, wherein:

said magnetizing step comprises a step of disposing said ferromagnetic object in a synthetic magnetic field sufficient to magnetize said permanent magnet to provide a magnetic field at least equal to said second magnitude of said magnetic field with a central axis of said ferromagnetic object disposed at said calibration angle relative to said synthetic magnetic field.

4. The method of claim 3, wherein:

said magnetizing step comprises a step of overmagnetizing said permanent magnet and a subsequent step of reducing the magnetic strength of said overmagnetized permanent magnet to said second magnitude of said magnetic field.

5. A method for calibrating an angular position sensor which is intended to have a rotatable permanent magnet and a magnetically sensitive component having an output signal which is representative of the angular position of said rotatable permanent magnet, said method comprising:

(a) providing an electrical coil, said electrical coil being rotatable about a first axis;

(b) with said permanent magnet absent from said angular position sensor, disposing said electrical coil at a location in relation to said magnetically sensitive component to simulate the presence of said rotatable permanent magnet;

(c) selecting a desired relationship between said output signal and the angular position of said permanent magnet, said desired relationship having a desired gain characteristic;

(d) providing an initial magnitude of electrical current through said electrical coil to create an initial magnitude of magnetic field emanating from said electrical coil;

(e) moving said electrical coil through at least two angular positions about said first axis;

(f) determining an initial relationship between said output signal and the angular position of said electrical coil for said initial magnitude of magnetic field;

(g) calculating an initial gain characteristic of said initial relationship;

(h) comparing said initial gain characteristic to said desired gain characteristic;

(i) providing a second magnitude of said electrical current to create a second magnitude of said magnetic field as a function of the difference between said initial gain characteristic and said desired gain characteristic, said second magnitude of electrical current being selected to achieve said desired gain characteristic, said providing step comprising a plurality of individual steps in which said second magnitude of magnetic field is incrementally changed to incrementally reduce the difference between said desired gain characteristic and said initial gain characteristic;

(j) rotating said electrical coil to cause said output signal to achieve a preselected calibration magnitude, said preselected calibration magnitude being selected as a function of said desired gain characteristic and a preselected angular position of said electrical coil;

(k) measuring a calibration angle of said electrical coil, relative to a first reference position of said angular position sensor, which achieves said preselected calibration magnitude of said output signal;

(l) magnetizing a ferromagnetic object to create said permanent magnet with said second magnitude of magnetic field at an angle equal to said calibration angle relative to a second reference position of said ferromagnetic object; and (m) disposing said permanent magnet in said angular position sensor with said second reference position aligned relative to said first reference position.

6. The method of claim 5, wherein:

said magnetizing step comprises a step of disposing said ferromagnetic object in a synthetic magnetic field sufficient to magnetize said permanent magnet to provide a magnetic field at least equal to said second magnitude of said magnetic field with a central axis of said ferromagnetic object disposed at said calibration angle relative to said synthetic magnetic field.

7. The method of claim 6, wherein:

said magnetizing step comprises a step of overmagnetizing said permanent magnet and a subsequent step of reducing the magnetic strength of said overmagnetized permanent magnet to said second magnitude of said magnetic field.

* * * * *